UNITED STATES PATENT OFFICE.

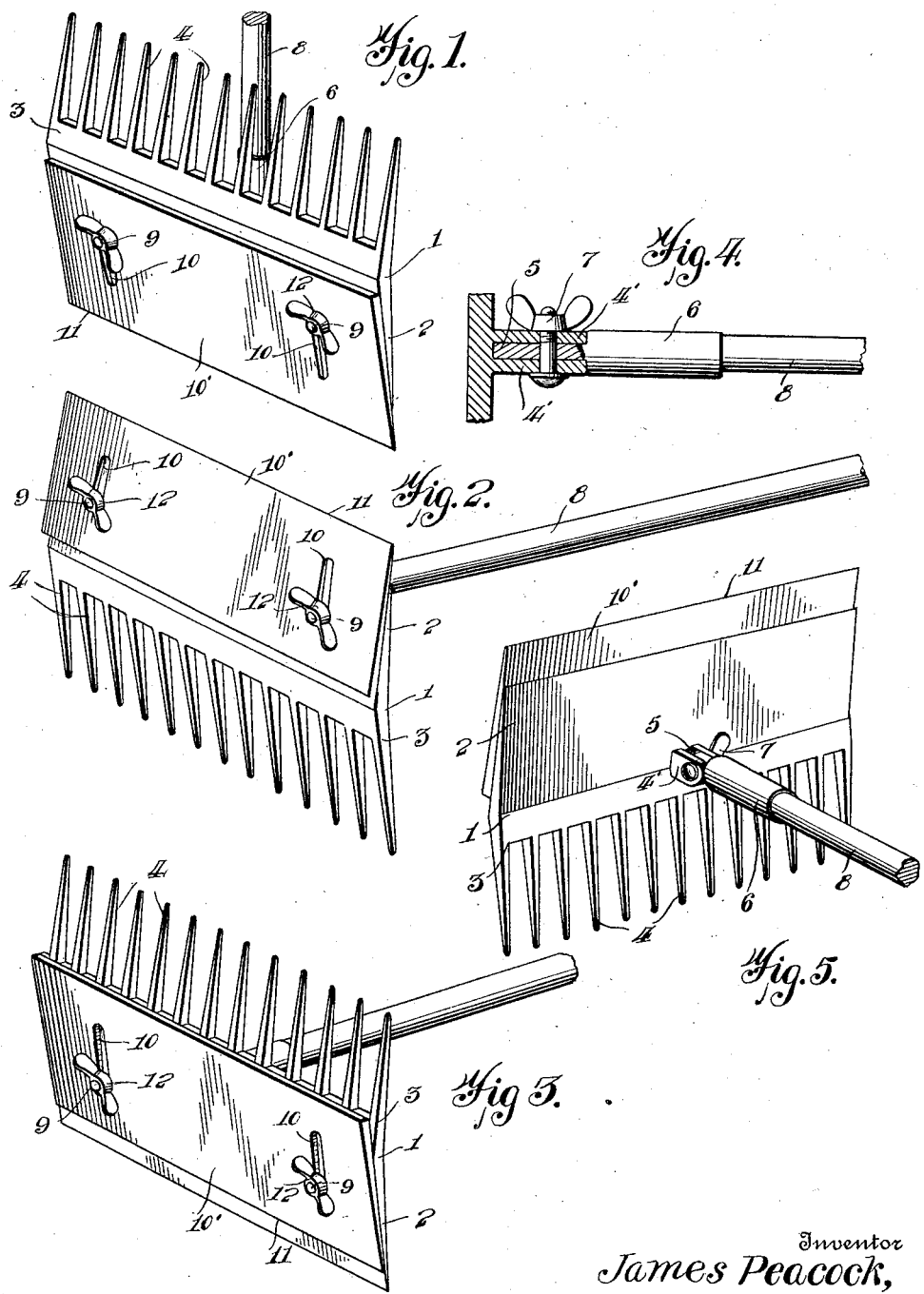

JAMES PEACOCK, OF HAMILTON, ONTARIO, CANADA.

GARDEN-TOOL.

1,050,685.  Specification of Letters Patent.  Patented Jan. 14, 1913.

Application filed February 6, 1912. Serial No. 675,907.

*To all whom it may concern:*

Be it known that I, JAMES PEACOCK, a subject of the King of Great Britain, residing at Hamilton, in the Province of Ontario and Dominion of Canada, have invented new and useful Improvements in Garden-Tools, of which the following is a specification.

This invention relates to garden tools and has for an object to provide a combined tool of this character wherein will be embodied, a rake, a sod trimmer and a hoe which are so arranged relatively to the handle that either one may be conveniently exposed for use.

In the drawing forming a part of this application and in which like reference numerals indicate like parts throughout the several views:—Figure 1 is a perspective view of the tool showing the same in use as a sod trimmer. Fig. 2 is a perspective view of the tool showing the same in use as a rake. Fig. 3 is a similar view showing the device in use as a hoe. Fig. 4 is a section through a portion of the handle and through the head. Fig. 5 is a rear perspective view of the head.

The tool comprises a head 1 having a hoe blade forming portion 2 and a rake forming portion 3, the latter being provided with the usual raking teeth 4, as shown in Fig. 2 of the drawing. The portions 2 and 3 are disposed at an obtuse angle relatively whereby they may be conveniently singly presented for use. The head 1 carries the spaced ears 4' between which the lug 5 on the socket member 6 is fitted and maintained in operative position through the medium of the clamping bolt or like suitable well-known means 7. The handle 8 has its lower end secured in the socket member whereby the position of the latter with relation to either of the portions 2 and 3 can be adjusted to suit the occasion. When the head 1 and the handle 8 are relatively adjusted as shown in Figs. 2 and 3, the tool is reversible and the parts 2 and 3 may be singly presented for use by simply rotating the handle 8.

The portion 2 of the tool is provided with integral studs 9 which extend through the elongated slots 10 in the sod trimming blade 10'. This blade is adjustable on the said portion 2 whereby its cutting edge 11 can be extended outwardly of the raking edge of the hoe portion 2 as shown in Fig. 1 of the drawing and the blade may be held in its adjusted position by means of the clamping nuts 12 on the studs 9. Now, it is seen that after the blade 10 has been adjusted as above described, the handle may be adjusted against the rake portion 4 as shown in Fig. 1 and secured thereagainst by means of the hereinbefore described means 7. When these adjustments are made the portion 2 will be substantially vertically disposed with relation to the handle 8 and the full weight of the operation can be brought to bear against the handle to cause the blade 10 to effect the proper cut of sod.

I claim:—

A combined lawn rake, scraper and cutter comprising a head member and a rake member, said members being disposed at an obtuse angle to one another, studs formed integral on the outer face of said head, relatively spaced ears formed integral with the inner face of said head, intermediate the longitudinal side edges thereof, a handle pivotally connected between said ears and adapted for vertical adjustments, an adjustable slotted blade of the same configuration as said head, the said studs passing through the slot of said blades and projecting beyond the outer face thereof, means on said projecting portions of the studs for holding and permitting of different vertical adjustments of the blade on the outer face of said head.

In testimony whereof I affix my signature in presence of two witnesses.

JAMES PEACOCK.

Witnesses:
 FRANK PEACE,
 BEATRICE EVANS.

Copies of this patent may be obtained for five cents each, by addressing the "Commissioner of Patents, Washington, D. C."